(12) United States Patent
Lee et al.

(10) Patent No.: US 9,825,481 B2
(45) Date of Patent: Nov. 21, 2017

(54) BLEEDER CIRCUITRY FOR INCREASING LEAKAGE CURRENT DURING HICCUP MODES OF POWER ADAPTERS

(71) Applicant: Apple Inc., Cupertino, CA (US)

(72) Inventors: Kisun Lee, Cupertino, CA (US); Bharat K. Patel, San Jose, CA (US); Abby Cherian, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 769 days.

(21) Appl. No.: 13/648,131

(22) Filed: Oct. 9, 2012

(65) Prior Publication Data

US 2013/0328415 A1   Dec. 12, 2013

Related U.S. Application Data

(60) Provisional application No. 61/656,932, filed on Jun. 7, 2012.

(51) Int. Cl.
| | | |
|---|---|---|
| H01H 47/00 | (2006.01) | |
| H01H 83/00 | (2006.01) | |
| H02J 7/00 | (2006.01) | |
| H02J 7/02 | (2016.01) | |
| H02M 3/335 | (2006.01) | |
| H02J 9/00 | (2006.01) | |
| H02M 3/337 | (2006.01) | |
| H02M 1/00 | (2006.01) | |

(52) U.S. Cl.
CPC ............. *H02J 7/022* (2013.01); *H02J 9/005* (2013.01); *H02M 3/335* (2013.01); *H02M 3/337* (2013.01); *H02M 2001/0032* (2013.01); *Y02B 70/16* (2013.01); *Y10T 307/858* (2015.04)

(58) Field of Classification Search
CPC ... H02H 11/00; H02H 3/00; H02J 9/06; H02J 9/061; H02J 7/00; H03K 17/0822; H05B 39/08; H02M 3/335; H02M 7/02
USPC .................. 307/125, 126; 361/93.4, 18, 87; 363/21.09, 146, 21.18, 21.15; 320/166; 250/206, 551
See application file for complete search history.

(56) References Cited

U.S. PATENT DOCUMENTS

| | | | | |
|---|---|---|---|---|
| 6,411,483 | B1* | 6/2002 | Sarles et al. ................. | 361/93.4 |
| 7,911,817 | B2* | 3/2011 | Kasprzak et al. ............ | 363/146 |
| 8,693,218 | B2* | 4/2014 | Chueh ............... | H02M 3/33507 363/21.15 |
| 2008/0265133 | A1* | 10/2008 | Sawtell ............. | H02M 3/33523 250/206 |
| 2010/0067268 | A1* | 3/2010 | Kasprzak .............. | H02M 3/335 363/74 |
| 2010/0321964 | A1* | 12/2010 | Brinlee et al. ............. | 363/21.18 |
| 2011/0103104 | A1* | 5/2011 | Zhan ................. | H02M 3/33507 363/21.17 |
| 2011/0241629 | A1* | 10/2011 | Jordan ......................... | 320/166 |

(Continued)

*Primary Examiner* — Rexford Barnie
*Assistant Examiner* — Jagdeep Dhillon
(74) *Attorney, Agent, or Firm* — Blank Rome LLP

(57) ABSTRACT

The disclosed embodiments provide a system that facilitates operation of a power adapter in hiccup mode. The system includes a bleeding mechanism that reduces a hiccup time of the hiccup mode by increasing a leakage current of the power adapter. The system also includes an activation mechanism that activates the bleeding mechanism upon detecting a voltage drop associated with the hiccup mode.

19 Claims, 5 Drawing Sheets

(56) References Cited

U.S. PATENT DOCUMENTS

2012/0300505 A1* 11/2012 Chueh .............. H02M 3/33507
363/21.09

* cited by examiner

BLEEDER CIRCUITRY FOR INCREASING LEAKAGE CURRENT DURING HICCUP MODES OF POWER ADAPTERS

RELATED APPLICATION

This application hereby claims priority under 35 U.S.C. §119 to U.S. Provisional Application No. 61/656,932, entitled "Circuitry to Reduce the Hiccup Time Without Increasing the Loss," by Kisun Lee, Baratkumar K. Patel, Abby Cherian, filed 7 Jun. 2012.

BACKGROUND

Field

The disclosed embodiments relate to techniques for facilitating the operation of power adapters in hiccup mode. More specifically, the disclosed embodiments relate to bleeder circuitry for increasing leakage current during hiccup modes of power adapters.

Related Art

Rechargeable batteries are presently used to provide power to a wide variety of portable electronic devices, including laptop computers, tablet computers, mobile phones, personal digital assistants (PDAs), digital music players, and cordless power tools. The most commonly used type of rechargeable battery is a lithium battery, which can include a lithium-ion or a lithium-polymer battery.

During operation, a portable electronic device may be connected to a power adapter that converts alternating current (AC) mains electricity into direct current (DC) and/or a voltage compatible with the battery and/or components of the portable electronic device. Power from the power adapter may then be used to charge the battery and/or supply power to components in the portable electronic device. In the absence of the power adapter and/or mains electricity, the portable electronic device may be powered by the battery until the battery is fully discharged.

To prevent no-load power consumption by the power adapter, the power adapter may switch off if the portable electronic device is disconnected from the power adapter. Before switching off, the power adapter may use a hiccup mode to detect if the portable electronic device is connected to the power adapter or not. For example, the power adapter may operate in hiccup mode whenever the portable electronic device draws a small amount of power, such as when the portable electronic device is in a sleep mode and the battery of the portable electronic device is fully charged.

During the hiccup mode, the power adapter may periodically open a switch that disconnects the power adapter from mains electricity and monitor the subsequent voltage drop in the power adapter's voltage. If the voltage drops quickly, the power adapter may determine that the portable electronic device is connected to the power adapter and continue supplying power to the portable electronic device. If the voltage drops slowly, the power adapter may determine that the portable electronic device is not connected to the power adapter and switch off to prevent components in the power adapter from unnecessarily drawing mains electricity while the power adapter is not being used to supply power to the portable electronic device.

However, the hiccup mode may interfere with the operation and/or use of other components associated with the portable electronic device and/or power adapter. For example, the portable electronic device may be connected to the power adapter using a MagSafe (MagSafe™ is a registered trademark of Apple Inc.) connector that includes a set of light-emitting diodes (LEDs) indicating the charging and/or fully charged state of the portable electronic device. During the hiccup mode, the LEDs may turn off after the voltage in the power adapter drops below a pre-specified threshold. If the hiccup time of the hiccup mode extends past a certain point, the LEDs may flicker visibly, which may negatively impact the user experience with the portable electronic device.

Hence, what is needed is a mechanism for reducing hiccup times of hiccup modes in power adapters.

SUMMARY

The disclosed embodiments provide a system that facilitates operation of a power adapter in hiccup mode. The system includes a bleeding mechanism that reduces a hiccup time of the hiccup mode by increasing a leakage current of the power adapter. The system also includes an activation mechanism that activates the bleeding mechanism upon detecting a voltage drop associated with the hiccup mode.

In some embodiments, the voltage drop is detected using a diode and a capacitor.

In some embodiments, the bleeding mechanism is activated using one or more field-effect transistors (FETs) coupled to the diode and the capacitor.

In some embodiments, the bleeding mechanism is further activated using a resistor connected to the capacitor.

In some embodiments, the bleeding mechanism comprises a resistor.

In some embodiments, the activation mechanism and the bleeding mechanism are associated with a computer system connected to the power adapter.

In some embodiments, the hiccup mode is associated with low power consumption on the computer system.

In some embodiments, the reduced hiccup time prevents visible flickering of a light-emitting diode (LED) connected to the power adapter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
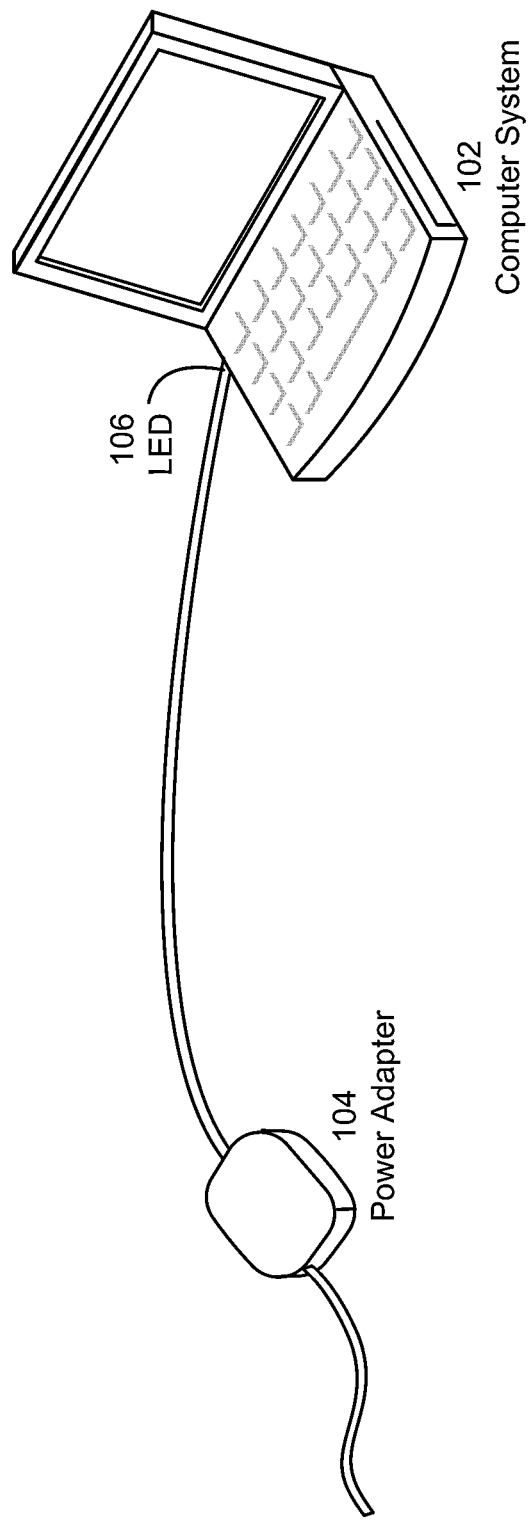
FIG. 1 shows the use of a power adapter in accordance with the disclosed embodiments.

The disclosed embodiments provide a method and system for facilitating use of a power adapter. As shown in FIG. 1, a computer system 102 may be connected to an external power adapter 104 that converts alternating current (AC) mains electricity into direct current (DC) and/or a voltage that can be used to charge a battery of computer system 102 and/or operate components in computer system 102. For example, computer system 102 may be a personal computer, laptop computer, tablet computer, mobile phone, portable media player, and/or other type of battery-powered electronic device that is connected to power adapter 104 using a Universal Serial Bus (USB) connector, MagSafe (MagSafe™ is a registered trademark of Apple Inc.) connector, and/or other type of power connector.

To reduce and/or prevent no-load power consumption by power adapter 104, power adapter 104 may switch off upon detecting that computer system 102 is disconnected from power adapter 104. Before switching off, power adapter 104 may use a hiccup mode to verify the connection or disconnection of computer system 102. For example, power adapter 104 may operate in hiccup mode whenever computer system 102 consumes a relatively low amount of power, such as when computer system 102 is in a sleep mode.

During the hiccup mode, power adapter 104 may periodically open a switch and monitor the subsequent voltage drop in power adapter 104 caused by leakage current associated with power adapter 104. If the voltage drops quickly (e.g., if the leakage current is high), power adapter 104 may determine that computer system 102 is connected to power adapter 104 and continue supplying power to computer system 102. If the voltage drops slowly (e.g., if the leakage current is low), power adapter 104 may determine that computer system 102 is not connected to power adapter 104 and switch off.

However, the hiccup mode may interfere with the operation and/or use of other components associated with the portable electronic device and/or power adapter. For example, the hiccup mode may cause a light-emitting diode (LED) 106 in the connector (e.g., a MagSafe connector) to turn off after the voltage in the power adapter drops below a pre-specified threshold. If the hiccup time of the hiccup mode extends past a certain point, the off-state of LED 106 may be visible to a user and negatively impact the user's experience with computer system 102.

Figure 2:
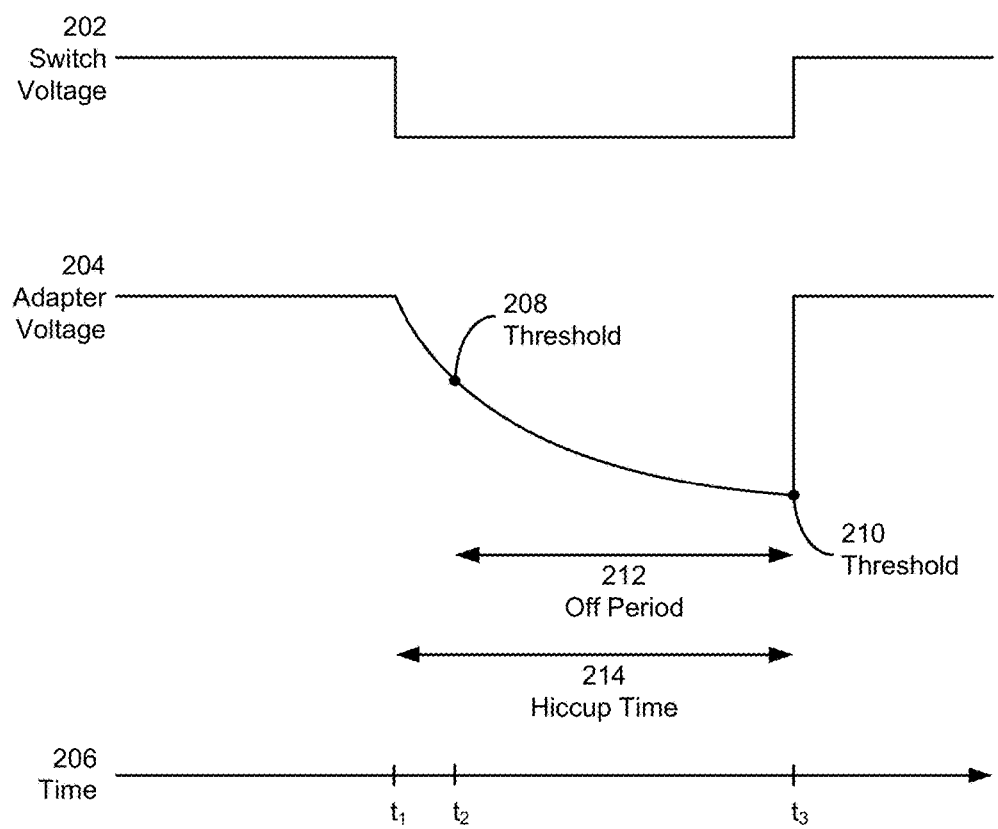
FIG. 2 shows a set of voltages associated with the operation of a power adapter in hiccup mode over time in accordance with the disclosed embodiments.

More specifically, FIG. 2 shows a set of voltages associated with the operation of a power adapter (e.g., power adapter 104 of FIG. 1) in hiccup mode over time 206 in accordance with the disclosed embodiments. As shown in FIG. 2, an adapter voltage 204 of the power adapter and a switch voltage 202 of a switch in the power adapter may initially be relatively constant over time 206. For example, adapter voltage 204 and switch voltage 202 may stay at a high level while the switch is closed and the power adapter is connected to mains electricity and/or another voltage source.

Once time 206 reaches $t_1$, the switch may be opened, effectively disconnecting the power adapter from mains electricity and/or another voltage source. Adapter voltage 204 may then begin to drop from leakage current caused by components connected to the power adapter. As a result, adapter voltage 204 may drop relatively quickly if a computer system (e.g., computer system 102 of FIG. 1) is connected to the power adapter and relatively slowly if the computer system is disconnected from the power adapter.

At time $t_2$, adapter voltage 204 may fall below a threshold 208 that turns off an LED (e.g., LED 106 of FIG. 1) connected to the power adapter. An off period 212 for the LED may then continue until time 206 reaches $t_3$, when adapter voltage 204 reaches another threshold 210. In addition, a hiccup time 214 between $t_1$ and $t_3$ may be used to determine the connection of the computer system to the power adapter. For example, if adapter voltage 204 reaches threshold 210 within a pre-specified period (e.g., 300 ms), the power adapter may detect that the computer system is connected to the power adapter. In turn, the switch may be closed, and both switch voltage 202 and adapter voltage 204 may return to the constant levels seen before $t_1$. The power adapter may then repeat the hiccup mode periodically to verify that the computer system is still connected to the power adapter and/or detect a disconnection of the computer system from the power adapter.

Conversely, if adapter voltage 204 does not reach threshold 210 within the pre-specified period, the power adapter may detect that the computer system has been disconnected from the power adapter. The power adapter may then be switched off, causing the LED to remain off. In turn, adapter voltage 204 may continue to decrease until adapter voltage 204 reaches 0 and/or the computer system is reconnected to the power adapter.

Those skilled in the art will appreciate that the LED may alternate between an on-state and an off-state as the switch is opened and closed during the hiccup mode. Moreover, such toggling of the LED may cause visible flickering in the LED if hiccup time 214 and/or off period 212 are extended past a certain point. For example, hiccup time 214 and/or off period 212 may be extended if the leakage current of the computer system is reduced to increase the efficiency of the computer system. Moreover, techniques for averting such flickering by decreasing hiccup time 214 without increasing the leakage current, such as modifying an output capacitor to produce a larger voltage drop with the same leakage current, may result in increased electromagnetic interference (EMI) with other components of the computer system.

In one or more embodiments, hiccup time 214 is reduced by increasing the leakage current of the computer system during only the hiccup mode. To selectively increase the leakage current during the hiccup mode, the voltage drop in adapter voltage 204 may be detected, and a bleeding mechanism may be activated to increase the leakage current during the hiccup mode.

Figure 3:
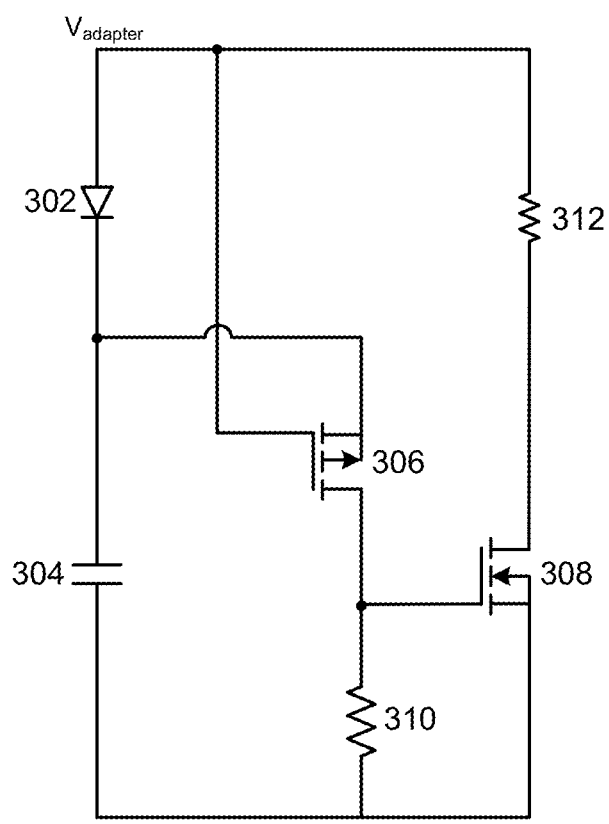
FIG. 3 shows bleeder circuitry for increasing leakage current during a hiccup mode of a power adapter in accordance with the disclosed embodiments.

As shown in FIG. 3, bleeder circuitry for increasing the leakage current during the hiccup mode may include a diode 302, a capacitor 304, a p-channel field-effect transistor (PFET) 306, an n-channel FET (NFET) 308, and two resistors 310-312. While the power adapter is connected to mains electricity and/or another power source (e.g., while the switch is closed), diode 302 conducts, and adapter voltage ("$V_{adapter}$") from the power adapter may charge capacitor 304, allowing the voltage of capacitor 304 to follow the adapter voltage. In addition, both FETs 306-308 may be turned off, and the leakage current of the computer system is not increased.

However, when the adapter voltage decreases (e.g., when the switch is open), the voltage across capacitor 304 becomes higher than the adapter voltage, and FET 306 turns on, increasing the gating voltage of FET 308 until FET 308 also turns on. In addition, resistor 310 may regulate the discharging of capacitor 304 and, in turn, the timing between the on times of FETs 306-308. Once FET 308 conducts, resistor 312 causes the leakage current to increase, thus "bleeding" the adapter voltage. Bleeding of the adapter voltage may also be caused by resistor 310, but resistor 312 may be selected to be significantly smaller than resistor 310 and thus affect the leakage current much more than resistor 310.

After capacitor 304 has discharged to the same level as the adapter voltage, FETs 306-308 may turn off and stop bleeding of the adapter voltage. As with the on times of FETs 306-308, the off times of FET 306-308 may be based on resistor 310. Once the power adapter is reconnected to the voltage source, the increase in adapter voltage may cause diode 302 to conduct and charge capacitor 304, returning the bleeder circuitry to the state before disconnection of the power adapter from the voltage source.

Figure 4:
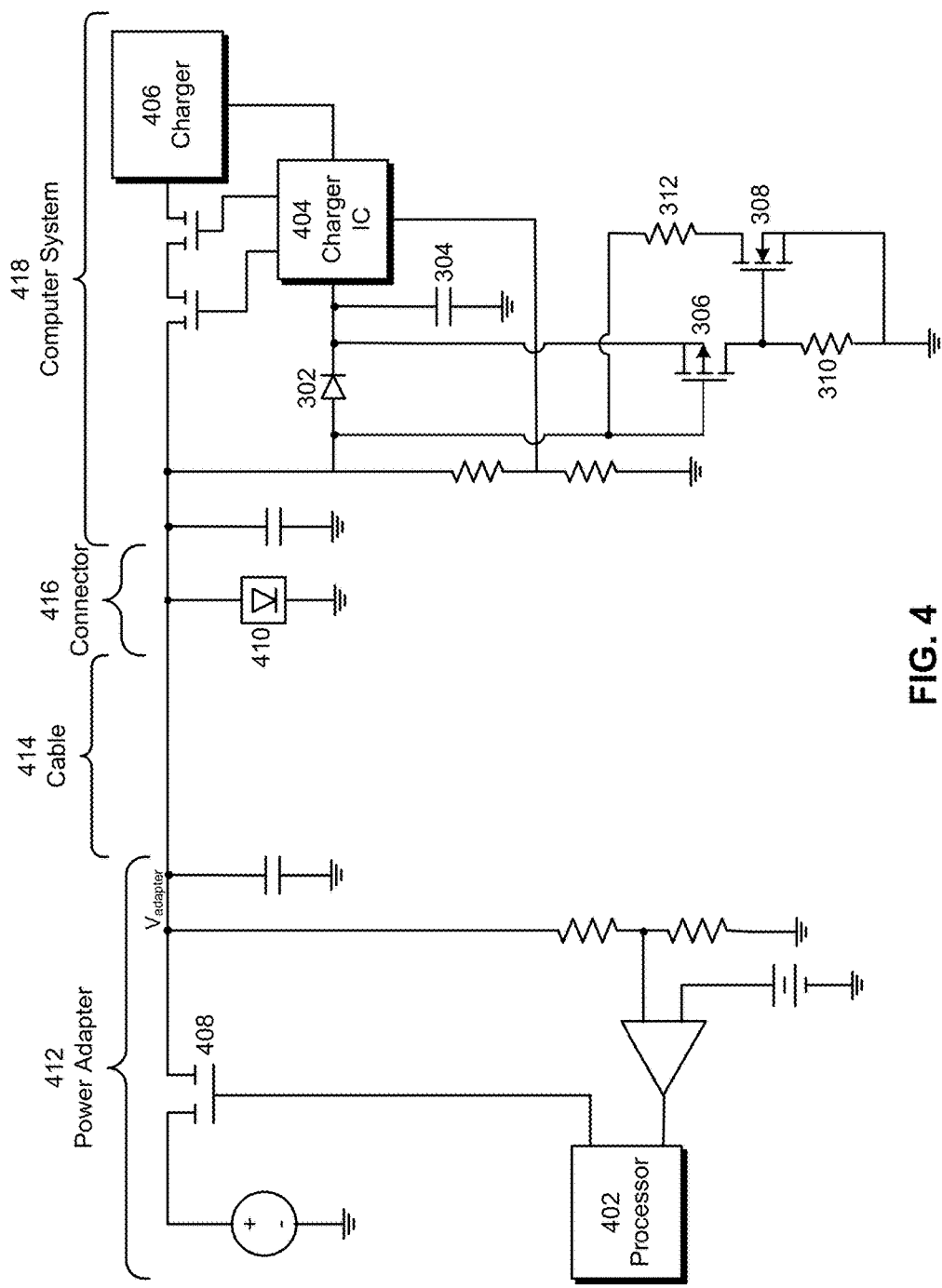
FIG. 4 shows a system for facilitating operation of a power adapter in accordance with the disclosed embodiments.

The bleeder circuitry may additionally be added to and/or utilize existing circuitry in the computer system. As shown in FIG. 4, a power adapter 412 may include a switch 408 that is controlled by a processor 402 (e.g., a microprocessor). Processor 402 may also monitor the adapter voltage ("$V_{adapter}$") of power adapter 412 during a hiccup mode of power adapter 412. For example, processor 402 may use the hiccup mode to detect if a computer system 418 is connected to power adapter 412 via a connector 416 and a cable 414 during low-power states of computer system 418 (e.g., a sleep mode).

On computer system 418, one or more components of the bleeder circuitry of FIG. 3 may be added to circuitry associated with a charger 406 and/or a charger integrated circuit (IC) 404 that process electricity from power adapter 412 into a form that is compatible with components and/or a battery of computer system 418. More specifically, FETs 306-308 and resistors 310-312 may be added to existing circuitry on computer system 418 that includes diode 302 and capacitor 304. For example, FETs 306-308 may be packaged together into the same IC, and the packaged IC and two resistors 310-312 may be added to the existing layout of computer system 418 to implement the bleeder circuitry.

As mentioned above, the bleeder circuitry may reduce the hiccup time of the hiccup mode by increasing the leakage current of power adapter 412. For example, the bleeder circuitry may increase the leakage current after switch 408 is opened by processor 402, causing the adapter voltage to drop at a faster rate than if computer system 418 did not include the bleeder circuitry. The faster voltage drop may cause processor 402 to close switch 408 before an off-state of an LED 410 in connector 416 can be observed by a user, thus preventing visible flickering of LED 410.

Figure 5:
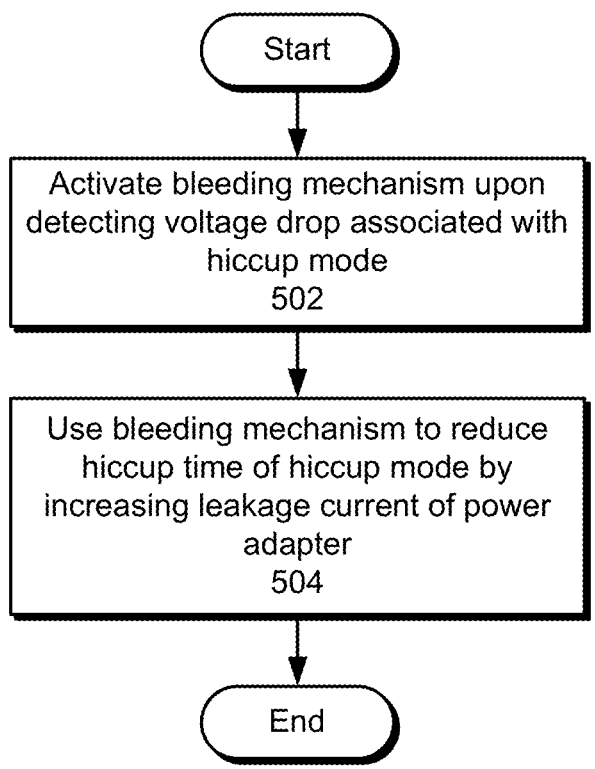
FIG. 5 shows a flowchart illustrating the process of facilitating operation of a power adapter in hiccup mode in accordance with the disclosed embodiments.

FIG. 5 shows a flowchart illustrating the process of facilitating operation of a power adapter in hiccup mode in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

First, a bleeding mechanism is activated upon detecting a voltage drop associated with the hiccup mode (operation 502). The voltage drop may be initiated after a switch in the power adapter is opened. In addition, the voltage drop may be detected using a diode and/or a capacitor, and the bleeding mechanism may be activated using one or more FETs coupled to the diode and/or capacitor.

Next, the bleeding mechanism is used to reduce a hiccup time of the hiccup mode by increasing a leakage current of the power adapter (operation 504). The bleeding mechanism may include one or more resistors that "bleed" the adapter voltage from the power adapter, causing the leakage current to increase during the hiccup mode. For example, the bleeding mechanism may be used to prevent visible flickering of an LED connected to the power adapter that is caused by a longer hiccup time of the hiccup mode. The bleeding mechanism may then be deactivated once the power adapter exits the hiccup mode and/or before the end of the hiccup mode to prevent the increased leakage current from decreasing the efficiency of the computer system while the power is supplied to the computer system from the power adapter.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for facilitating operation of a power adapter in hiccup mode, comprising:
   an electronic device configured to be coupled to the power adapter, wherein the electronic device comprises:
      a bleeding circuit configured to reduce a duration of the hiccup mode by selectively increasing a leakage current associated with the power adapter, wherein the bleeding circuit comprises a first resistor and a second resistor; and
      an activation circuit configured to activate at least one of the first and second resistors upon detecting a voltage drop associated with the hiccup mode, wherein the activation circuit comprises a first switching device configured to activate the first resistor when the first switching device is turned on, and a second switching device configured to activate the second resistor when the second switching device is turned on.

2. The system of claim 1, wherein the voltage drop is detected using a diode and a capacitor.

3. The system of claim 2, wherein the at least one switching device comprises one or more field-effect transistors (FETs) coupled to the diode and the capacitor.

4. The system of claim 1, wherein the first resistor controls turn on timing of the first switching device and the second switching device when the bleeding circuit is activated.

5. The system of claim 1, further comprising a connector configured to couple the power adapter to the electronic device, wherein the connector comprises a light indicating a state of charging of the electronic device.

6. The system of claim 1, wherein the hiccup mode is associated with low power consumption by the electronic device.

7. A method for facilitating operation of a power adapter in hiccup mode, wherein the power adapter is connected to an electronic device and comprises a bleeding circuit and an activation circuit, the method comprising:
using the activation circuit to activate the bleeding circuit in the electronic device upon detecting a voltage drop associated with the hiccup mode, the bleeding circuit thereby reducing a duration of the hiccup mode by selectively increasing a leakage current associated with the power adapter;
wherein the bleeding circuit comprises a first resistor and a second resistor, and
wherein the activation circuit comprises a first switching device configured to activate the first resistor when the first switching device is turned on, and a second switching device configured to activate the second resistor when the second switching device is turned on.

8. The method of claim 7, wherein the voltage drop is detected using a diode and a capacitor.

9. The method of claim 8, wherein the bleeding circuit is activated using one or more field-effect transistors (FETs) coupled to the diode and the capacitor.

10. The method of claim 7, wherein the first resistor controls turn on timing of the first switching device and the second switching device when the bleeding circuit is activated.

11. The method of claim 7, wherein the power adapter is connected to the electronic device via a connector, wherein the connector comprises a light indicating a state of charging of the electronic device.

12. The method of claim 7, wherein the hiccup mode is associated with low power consumption by the electronic device.

13. The method of claim 11, wherein the reduced duration of the hiccup mode prevents visible flickering of the light.

14. An electronic device, comprising:
a bleeding circuit comprising first and second resistors configured to reduce a duration of a hiccup mode in a power adapter connected to the electronic device by selectively increasing a leakage current associated with the power adapter; and
an activation circuit comprising first and second switching devices configured to activate the first and second resistors upon detecting a voltage drop associated with the hiccup mode;
wherein the first resistor controls turn on timing of the first switching device and the second switching device when the bleeding circuit is activated.

15. The electronic device of claim 14, wherein the voltage drop is detected using a diode and a capacitor.

16. The electronic device of claim 15, wherein the first and second switching devices are coupled to the diode and the capacitor.

17. The electronic device of claim 14, wherein the first switching device is configured to activate the first resistor when the first switching device is turned on and the second switching device is configured to activate the second resistor when the second switching device is turned on.

18. The electronic device of claim 14, wherein the hiccup mode is associated with low power consumption by the electronic device.

19. The electronic device of claim 14, wherein the electronic device is further configured to be connected to the power adapter via a connector, wherein the connector comprises a light indicating a state of charging of the electronic device.

* * * * *